United States Patent
Beaudoin

(10) Patent No.: US 7,287,763 B1
(45) Date of Patent: Oct. 30, 2007

(54) METHOD OF ATTACHMENT OF A SKI ON A SNOWMOBILE, AND RESULTING SNOWMOBILE

(75) Inventor: Denis Beaudoin, St-Nicéphore (CA)

(73) Assignee: 9158-7782 Quebec Inc., St-Nicéphore, Quebec (CA)

( * ) Notice: Subject to any disclaimer, the term of this patent is extended or adjusted under 35 U.S.C. 154(b) by 0 days.

(21) Appl. No.: 11/529,247

(22) Filed: Sep. 29, 2006

(51) Int. Cl.
*B62B 9/04* (2006.01)

(52) U.S. Cl. ................ 280/28; 845/11.12; 845/8; 845/182; 845/609; 845/183

(58) Field of Classification Search ............ 280/28, 280/845, 11.12, 8, 182, 609, 183; 180/182
See application file for complete search history.

(56) References Cited

U.S. PATENT DOCUMENTS

| | | | |
|---|---|---|---|
| 630,810 A | 8/1899 | Kidder | |
| 703,510 A | 7/1902 | Williams | |
| 3,593,814 A * | 7/1971 | Bauler | 280/8 |
| 3,632,126 A * | 1/1972 | Shorrock | 280/28 |
| 3,645,347 A | 2/1972 | Brant | |
| 3,675,939 A * | 7/1972 | Vik | 280/28 |
| 3,711,109 A | 1/1973 | Hofbauer | |
| 3,732,939 A | 5/1973 | Samson | |
| 3,778,074 A * | 12/1973 | Kozlow | 280/28 |
| 3,857,578 A | 12/1974 | Alton | |
| 5,344,168 A | 9/1994 | Olson et al. | |
| 6,513,612 B2 * | 2/2003 | Moriyama et al. | 180/182 |
| 2003/0034619 A1 | 2/2003 | Bergstrom | |
| 2004/0160026 A1 | 8/2004 | Lund | |

* cited by examiner

*Primary Examiner*—Christopher P. Ellis
*Assistant Examiner*—Cynthia F. Collado
(74) *Attorney, Agent, or Firm*—Francois Martineau

(57) ABSTRACT

A method of attachment of a ski to a snowmobile, the snowmobile capable of displacement about a gliding surface. The method comprises the step of providing the snowmobile with at least one steering link defining a push axis. It also comprises the step of providing a snowmobile ski having a ski body defining an undersurface, a snowmobile mounting member connected to the ski body, and at least one blade member attached to the ski body and arranged about the ski body undersurface, the blade member defining a leading end portion and a trailing end portion. The method finally comprises the step of attaching the snowmobile mounting member to the steering link such that the push axis substantially registers with the leading end portion of the blade member when the snowmobile glides on the gliding surface, thus enhancing adherence of the ski to the gliding surface.

6 Claims, 6 Drawing Sheets

US 7,287,763 B1

METHOD OF ATTACHMENT OF A SKI ON A SNOWMOBILE, AND RESULTING SNOWMOBILE

FIELD OF THE INVENTION

The present invention relates to snowmobiles, and more particularly to a method of attachment of a ski on a snowmobile and to the resulting snowmobile.

BACKGROUND OF THE INVENTION

The steering of snowmobiles is conventionally accomplished by a pair of ground engageable skis which are mounted on the front of the snowmobile and are turned in the direction in which the snowmobile is to be propelled. The turning radius of a snowmobile which is equipped with conventional skis, traversing very hard snow or ice is very large because the conventional ski runners merely slide along the gliding surface without "digging in". To overcome this, snowmobile skis are provided with keels on the underside thereof, having sharpened carbide blade members which cut or bite into the gliding surface to positively control the turning of the snowmobile.

However, merely providing blade members on the underside of the ski does not automatically bring about adherence of the ski to the gliding surface.

SUMMARY OF THE INVENTION

The present invention relates to a method of attachment of a ski to a snowmobile, the snowmobile capable of displacement about a gliding surface, comprising:
  providing said snowmobile with at least one steering link defining a push axis;
  providing a snowmobile ski having a ski body defining an undersurface, a snowmobile mounting member connected to said ski body, and at least one blade member attached to said ski body and arranged about said ski body undersurface, said blade member defining a leading end portion and a trailing end portion;
  attaching said snowmobile mounting member to said steering link such that said push axis substantially registers with said leading end portion of said blade member when said snowmobile glides on the gliding surface, thus enhancing adherence of said ski to the gliding surface.

In one embodiment, said steering link is an elongated kingpin defining a longitudinal axis, said push axis coincides with said longitudinal axis of said kingpin, and said mounting member is pivotally connected to said steering link.

In one embodiment, said ski body comprises a longitudinal runner extending on its said undersurface, said blade member carried by and extending longitudinally along said runner.

In one embodiment, said snowmobile ski comprises a wear bar affixed to said ski body undersurface and arranged substantially about said runner, said wear bar comprising said blade member.

In one embodiment, said wear bar further comprises a curved, plate-like smoothing member located forwardly of said blade member for flattening irregularities in the gliding surface.

In one embodiment, said wear bar comprises a trailing rod located rearwards of said smoothing member, said trailing rod carrying said blade member.

In one embodiment, said runner defines a groove therealong, said wear bar trailing portion registering below said runner groove.

The present invention also relates to a snowmobile for riding on a gliding surface, comprising
  a snowmobile body comprising propelling means and a steering mechanism having steering control means;
  at least one steering link defining a push axis, said steering link being operatively connected to said steering mechanism and being controlled by said steering control means;
  a snowmobile ski having a ski body defining an undersurface, a snowmobile mounting member connected to said ski body, and at least one elongated blade member attached to said ski body and arranged about said ski body undersurface, said blade member defining a leading end portion and a trailing end portion, said snowmobile mounting member being attached to said steering link such that said push axis substantially registers with said leading end portion of said blade member when said snowmobile glides on the gliding surface.

In one embodiment, said steering link is an elongated kingpin defining a longitudinal axis, said push axis coincides with said longitudinal axis of said kingpin, and said mounting member is pivotally connected to said steering link.

In one embodiment, said ski body comprises a longitudinal runner extending on its said undersurface, said blade member carried by and extending longitudinally along said runner.

In one embodiment, said snowmobile ski comprises a wear bar affixed to said ski body undersurface and arranged substantially about said runner, said wear bar comprising said blade member.

In one embodiment, said wear bar further comprises a curved, plate-like smoothing member located forwardly of said blade member for flattening irregularities in the gliding surface.

In one embodiment, said wear bar comprises a trailing rod located rearwards of said smoothing member, said trailing rod carrying said blade member.

In one embodiment, said runner defines a groove therealong, said wear bar trailing portion registering below said runner groove.

In one embodiment, said trailing rod is cross-sectionally polygonal.

In one embodiment, said trailing rod is cross-sectionally quadrangular.

In one embodiment, upon said snowmobile resting on the gliding surface, said push axis forms an angle of between 30 to 45° with said elongated blade member.

DETAILED DESCRIPTION OF THE EMBODIMENTS

Figure 1:
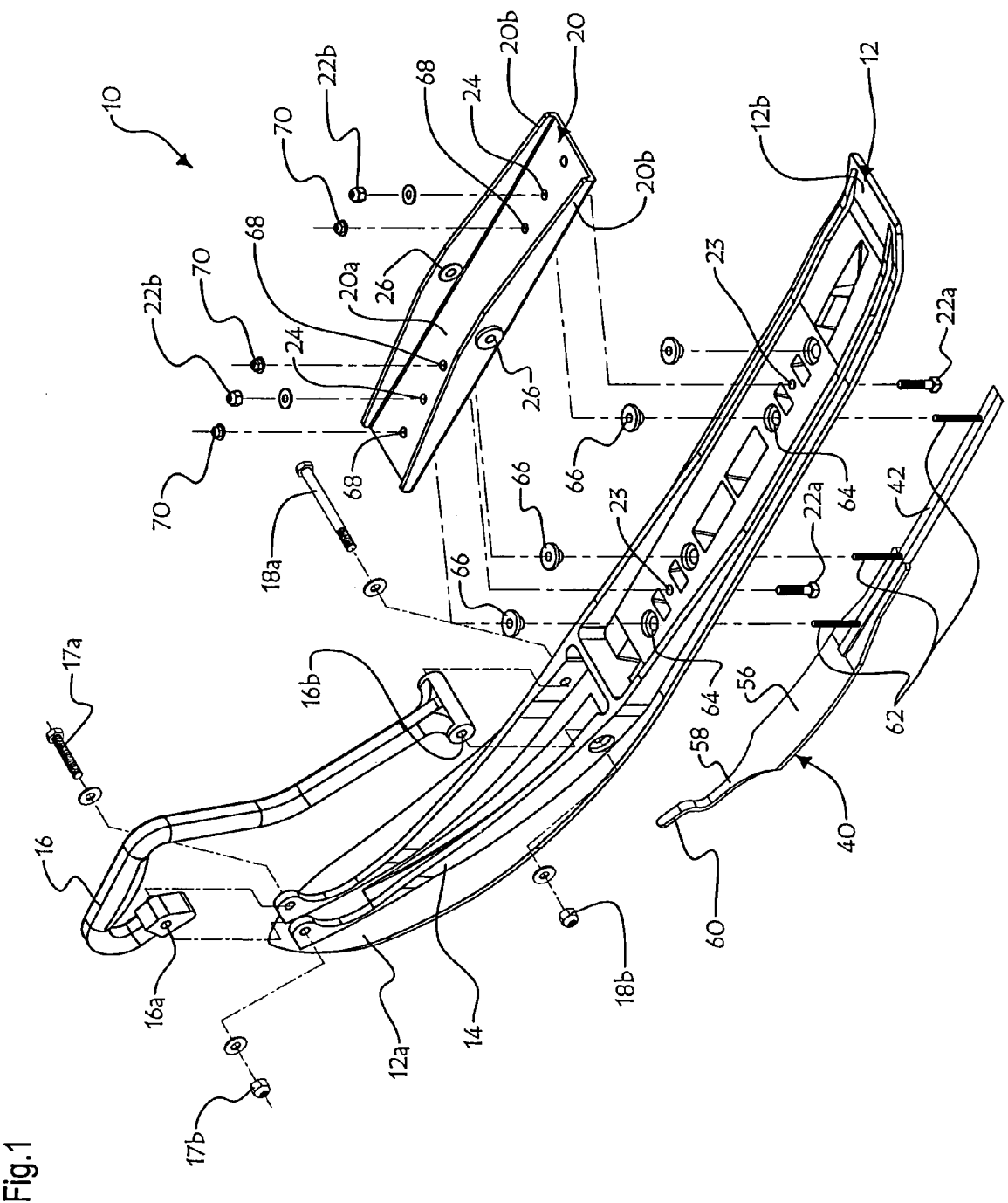
FIG. 1 is an exploded perspective view of a snowmobile ski.
Figure 2:
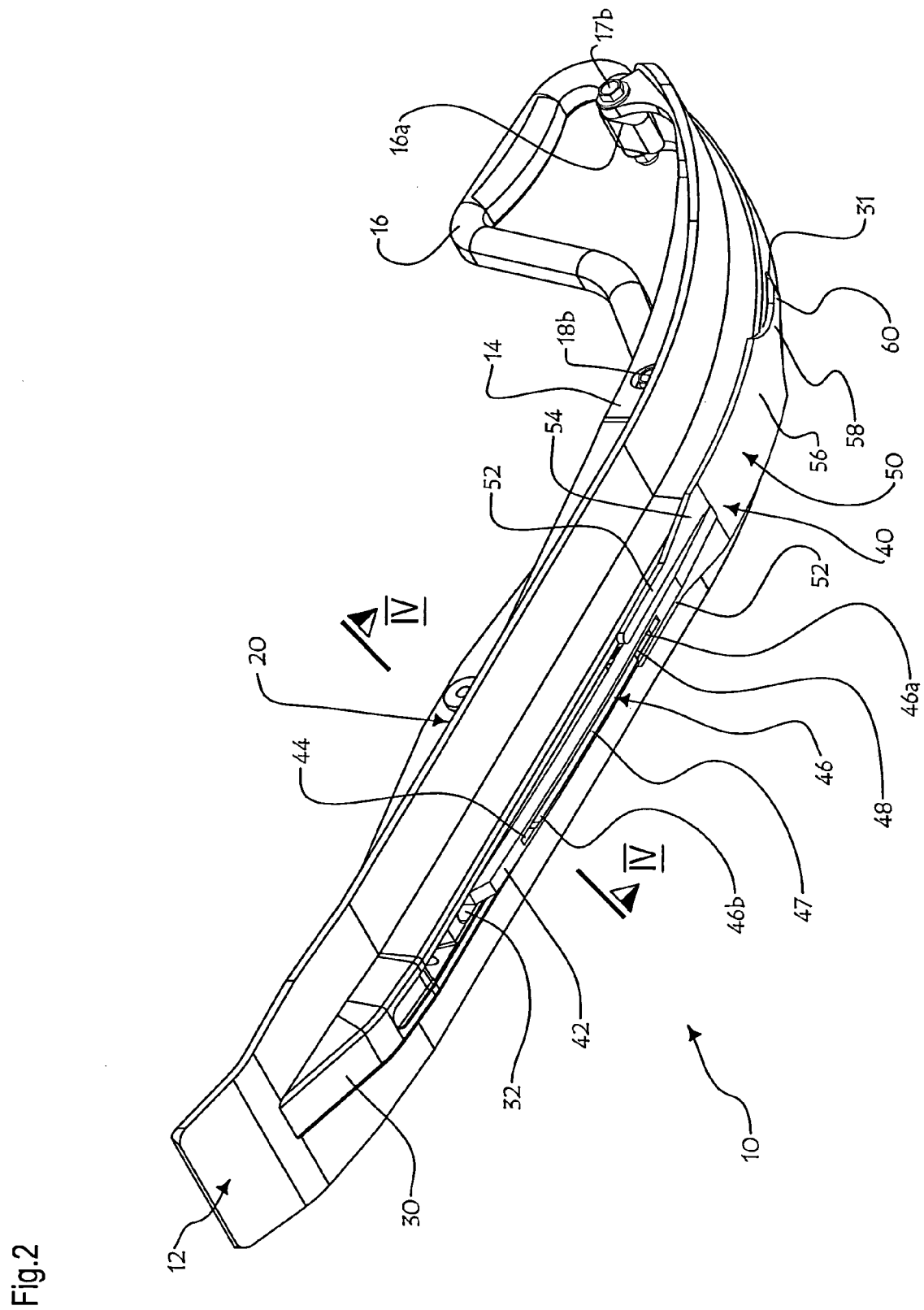
FIG. 2 is a bottom and assembled perspective view of the ski of FIG. 1.

FIGS. 1-2 show a snowmobile ski 10 according to the present invention. Ski 10 comprises a rigid main body 12, made of plastic for example, having an upturned leading end portion 12a and a slightly upturned trailing end portion 12b. The upper surface of ski main body 12 comprises an A-shaped projection 14 extending on the ski lengthwisely from the front to the rear end portions 12a and 12b of the ski main body 12. A conventional tension bar 16 is fixed to the leading end portion 12a of the ski body 12. The front in-turned end portion of tension bar 16 is pierced at 16a and is secured to a front section of A-shaped projection 19 using bolt 17a and nut 17b, as shown in FIG. 1. The T-shaped rear end portion of tension bar 16 is bored at 16b, and is secured to an intermediate section of A-shaped projection using bolt 18a and nut 18b.

Ski 10 also comprises a cross-sectionally U-shape snowmobile mounting plate 20 affixed to an intermediate section of the top face of ski body 12. Mounting plate 20 comprises a bottom wall 20a, and two parallel, trapezoid side flanges 20b, 20b each projecting perpendicularly from one of the longitudinal edges of mounting plate bottom wall 20a. Each one of side flanges 20b, 20b comprises an eyelet 26 made centrally in the central and widest section thereof, for engagement by one of the two front kingpins 72 of the snowmobile, as described hereinafter. Two bolts 22a, 22a penetrate through spaced apart holes 23, 23 made through ski body 12 from the bottom up, and then through registering holes 24, 24 made in the mounting plate 20, and corresponding nuts 22b, 22b are screwed to the top free end of the bolts 22a, 22a, thereby securing the mounting plate 20 to the ski.

Figure 4:
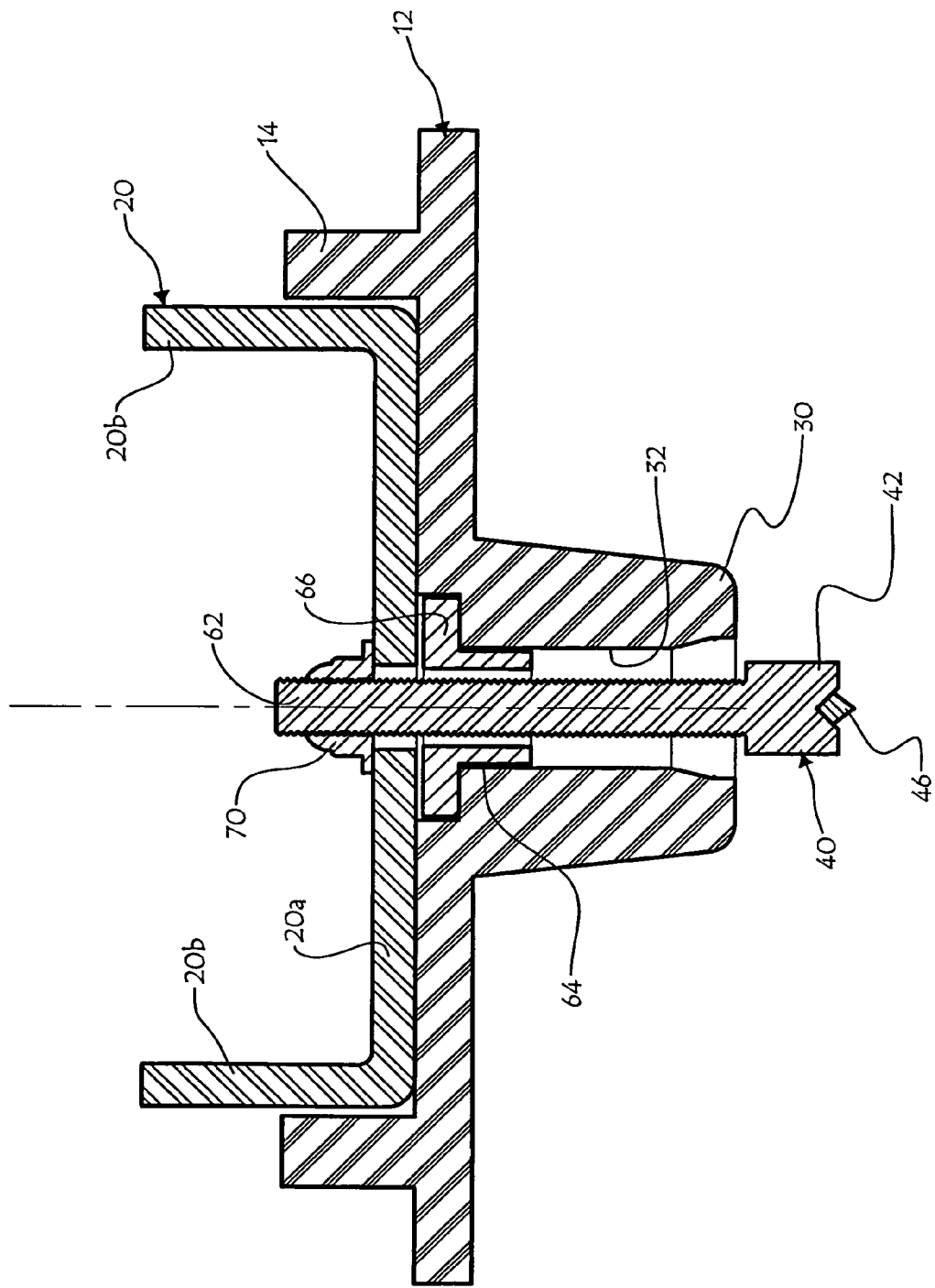
FIG. 4 is an enlarged cross-sectional view of the ski taken along lines IV-IV of FIG. 2.

As shown in FIG. 2, the undersurface of ski main body 12 is integrally formed with a runner 30 extending substantially between the front and trailing end portions 12a and 12b of the ski main body 12. Runner 30 tapers at both of its ends, as can be seen in FIG. 4. Keel 30 also comprises a longitudinal groove 32 made therealong, intermediate its tapered ends.

Ski 10 further comprises a wear bar 40, in turn having a trailing rod 42, cross-sectionally square in the drawings, but which could also have a polygonal or circular cross-section in alternate embodiments. On the undersurface of trailing rod 42 is made a longitudinal, cross-sectionally triangular groove 44, as seen in FIG. 2. A blade member 46, made of carbide for example, defines a leading end portion 46a and a trailing end portion 46b, is fixedly received in groove 44, and defines an elongated trailing portion 47 towards the trailing end of the ski, and a much shorter leading portion 48 located towards the leading end of the ski and having a cross-sectional area much smaller than that of trailing portion 47. Both trailing and leading portions 47 and 48 respectively of the carbide blade member 46 are cross-sectionally diamond-shaped, and snugly engage and are welded to the cross-sectionally triangular groove 44.

The front end portion of the wear bar trailing portion 42 merges with a smoothing member 50. Smoothing member 50 defines a couple of tabs 52, 52 extending longitudinally on each side of the front end portion of trailing rod 42, and are affixed thereto for example by welding. Opposite the free end of tabs 52, 52, tabs 52, 52 merge with a progressively widening transitional portion 54, into which the front end portion of trailing rod 42 also extends. Transitional portion 54 integrally merges with a plate portion 56 having a curved rectangular shape. Plate portion 56 in turn merges with a gradually narrowing neck portion 58. Wear bar 40, at the front end of neck portion 58, terminates with a bent, Z-shaped attachment finger 60.

Figure 3:
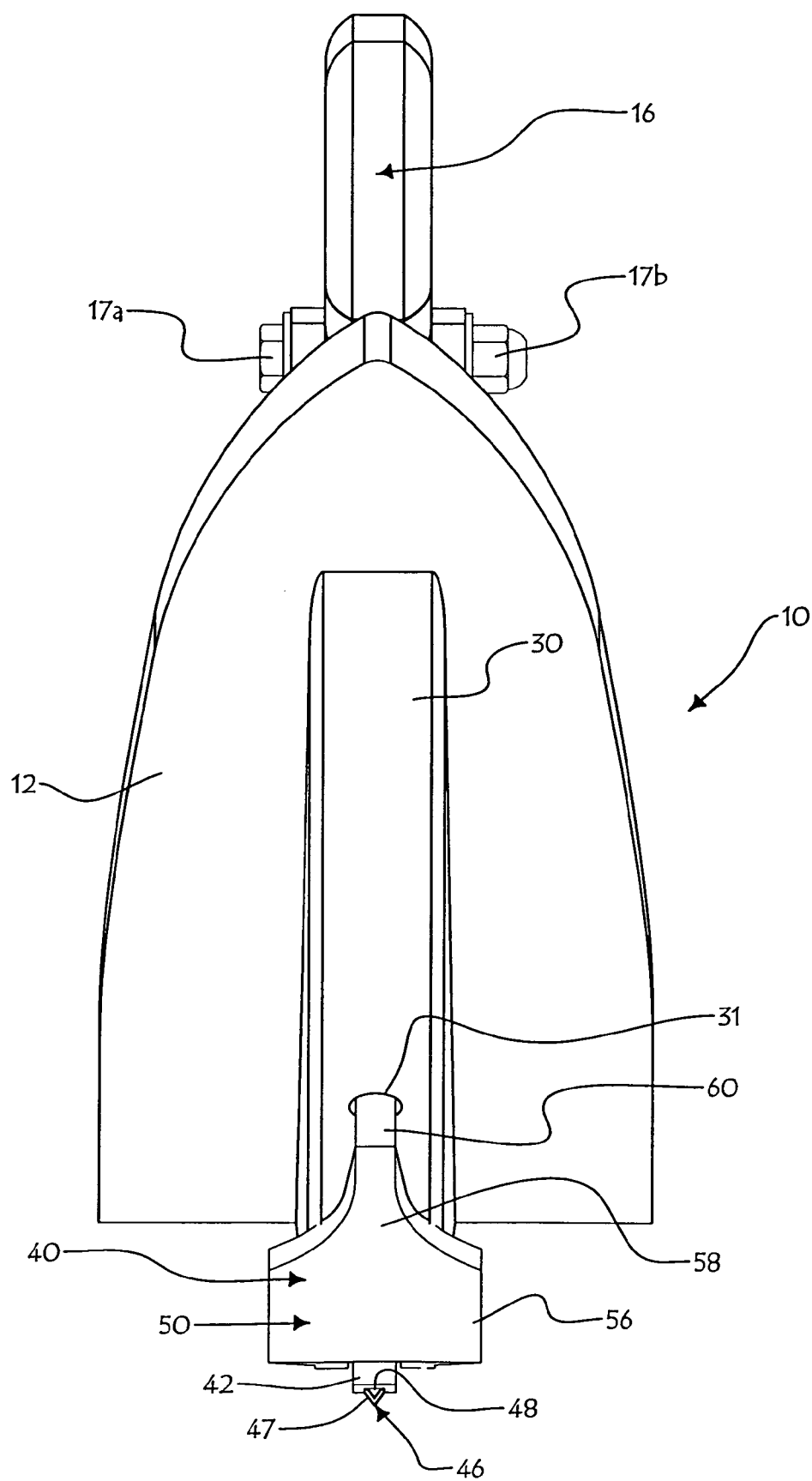
FIG. 3 is a front elevation at an enlarged scale of the ski of FIG. 2.
Figure 5:
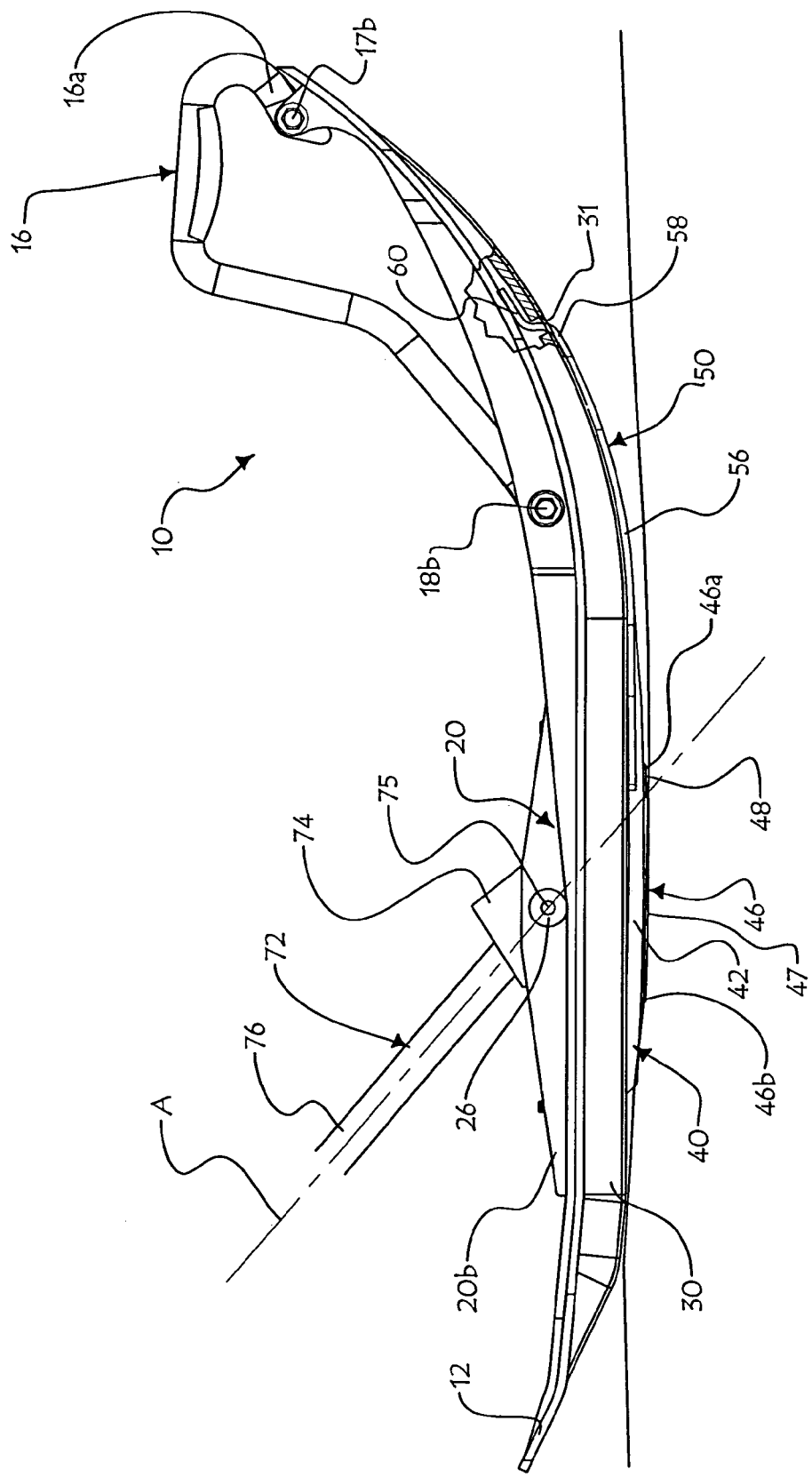
FIG. 5 is a side elevation showing the ski of FIG. 2 attached to the front end portion of the kingpin of a snowmobile, with the ski pressed against a gliding surface.

Wear bar 40 is attached to ski body 12 first by inserting the attachment finger 12 in a hole 31 made centrally through ski body 12, on runner 30 (see FIGS. 2, 3 or 5). A number of threaded shanks 62 (three shanks 62 are provided in the illustrated embodiment), are welded to the trailing rod 42 of the wear bar 40, on its upper surface, i.e. the surface opposite groove 44. Shanks 62 are received in the groove 32 made along runner 30, through the lumen of a T-shaped washer 66—in turn received in holes 64 made across ski body 12—and through holes 68 made across mounting plate bottom wall 20b. A nut 70 is screwed on the free end of each threaded shank 62, thus securing the wear bar to the ski body 12. As can be seen in FIG. 4, trailing rod 40 is located just below groove 32 in runner 30, and will be able to recoil therein if the gliding ski encounters a rock or other rigid obstacle.

Figure 6:
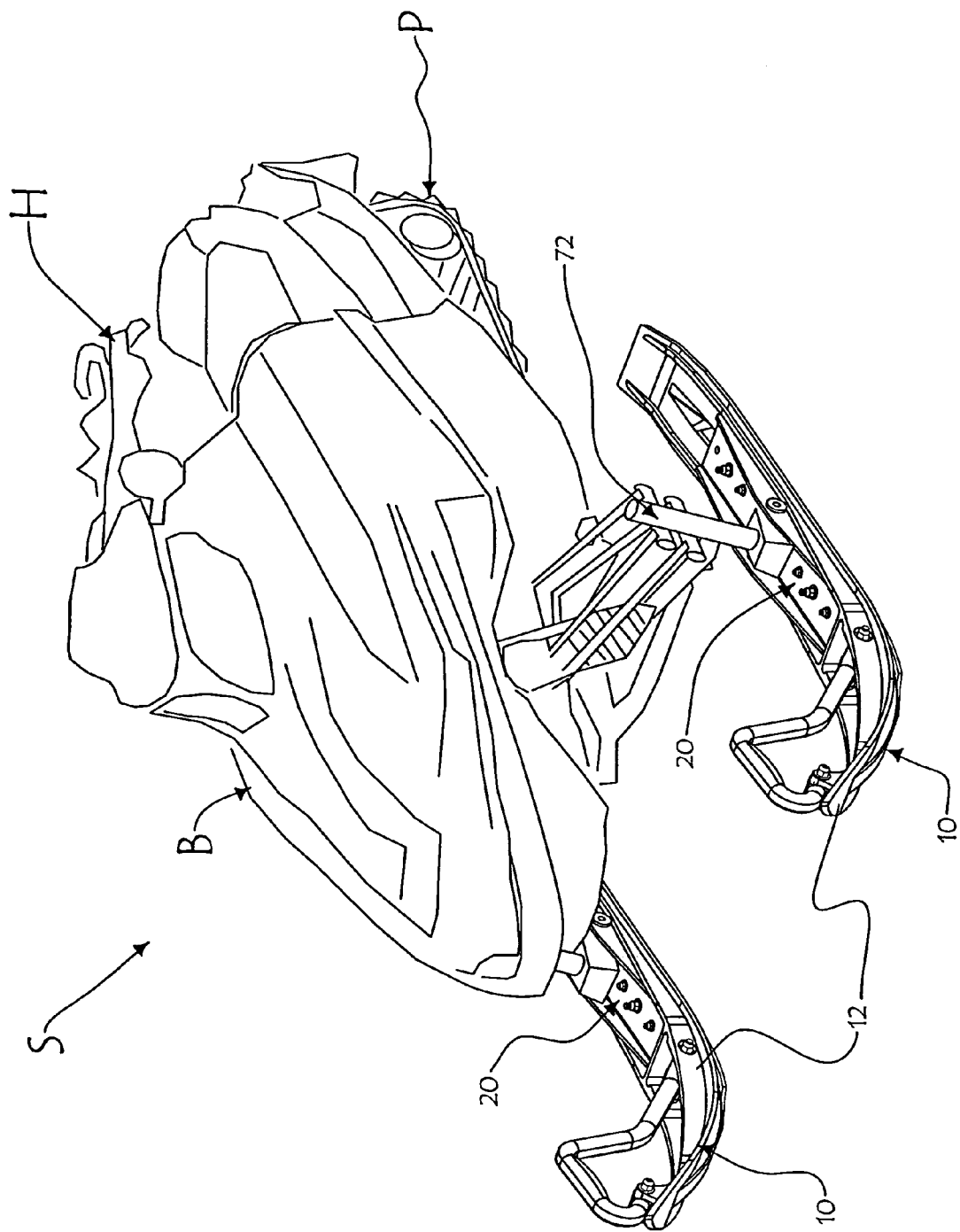
FIG. 6 is a schematic front perspective view of a snowmobile equipped with two snowmobile skis as shown in FIG. 2.

As shown in FIG. 5, ski 10 is destined to be connected to the kingpin 72—also referred to generically as a steering link herein—of a snowmobile S. Kingpin 72 comprises a mounting block 74 comprising laterally projecting swivel pins (only one swivel pin 75 is shown in FIG. 5), extending through the swivel holes 26, 26 made in ski mounting plate side walls 20b, 20b. This pivotal connection allows ski 10 to swivel relative to kingpin 72 along a substantially horizontal axis extending between both swivel holes 26, 26. Furthermore, mounting block 74 is fixedly connected to a steering rod 76. Steering rod 76 is in turn operatively connected to the steering mechanism (not shown) of the snowmobile, allowing the kingpin 72 to move concomitantly with the handlebars (or other steering control means) of the snowmobile S. Snowmobile S is of conventional construction and is schematically shown in FIG. 6, and generally comprises a bodywork B, conventional snowmobile propulsion means P (for example a belt-type propulsion assembly driven by a combustion engine lodged in the bodywork of the snowmobile), and handlebars H connected to the steering mechanism of the snowmobile (not shown), used to steer the snowmobile S when in forward motion.

Kingpin 72 defines a push axis A, as illustrated in FIG. 5, coinciding substantially with the longitudinally axis of steering rod 76. As illustrated in the figures, ski 10 is pivotally attached to kingpin 72 such that when the snowmobile S rests on the ground, the push axis A (FIG. 5) coincides with the leading end portion 46a of blade member 46, and the angle between push axis A and the longitudinal axis of elongated blade member 46 may be between 30° to 45°.

To drive the snowmobile having the ski/steering link arrangement described above, the user conventionally starts the snowmobile's engine, and actuates the propulsion means P of the snowmobile (for example by rotating the right handle). The snowmobile is consequently set in forwards motion about the snow- or ice-covered surface. Often, snowmobile are only allowed to ride on dedicated snowmobile trails, and these trails are marked with furrows already dug by the skis of previous snowmobiles. Such furrows can become a hazard as they have the tendency to destabilize the gliding motion of the skis of a snowmobile subsequently gliding thereon, and thus compromise the directional stability thereof. Therefore, as the snowmobile S glides forwardly on the snowy ground G (FIG. 5), its smoothing member 50, and more especially its curved plate member 56, will flatten out and even out irregularities in the incoming snow path to avoid the destabilizing action of the previously dug furrows. It will also tend to hard-pack, thus enhancing the biting action of the blade member 46 trailing immediately behind the smoothing member 50.

Moreover, and more importantly, since the push axis A registers substantially with the leading end portion 46a of the blade member 46, the push force applied by the snowmobile S, and more especially by the kingpin 72, on the snowmobile ski 10 (which is a compound force resulting from the weight of the snowmobile and the propulsion force), will be applied to a greater extent on the leading end portion 46a of the blade member 46. This will ensure that as the snowmobile S glides on a snowy and/or icy surface G, the leading end portion 46a of the blade member 46 bites very efficiently in the gliding surface G, thus promoting better adherence of the ski 10 on the snowy and/or icy gliding surface.

Indeed, if the force is applied more towards the end of the blade member, it has been found that the ski will have a tendency to shake in a quivering motion, especially in "hard-to-bite" surfaces such as icy or very hard-pack snowy surfaces. On the other end, it has been found that concentrating the force applied by the snowmobile on the ski, as it glides, on the front end of the blade member will ensure adequate bite action and adherence of the ski to the underlying surface.

Various modifications could be made to the present invention without departing from the scope of the appended claims.

For example, in an alternate embodiment, the illustrated kingpin 72 could be replaced with a suitable alternate steering link having a resultant push axis registering with the leading end portion of the blade member.

In an alternate embodiment, the ski undersurface could be provided with additional blade members for increasing the bite of the ski on the gliding surface.

Moreover, although blade member 46 discussed above has a diamond-shaped cross-section, it is understood that the blade member could have any other shape suitable for biting into a snowy or icy gliding surface.

The embodiments of the present invention, in which an exclusive property or privilege is claimed, are defined as follows:

1. A snowmobile for riding on a gliding surface, comprising:
    a snowmobile body comprising propelling means and a steering mechanism having steering control means;
    at least one steering link defining a push axis, said steering link being operatively connected to said steering mechanism and being controlled by said steering control means;
    a snowmobile ski having a ski body defining an undersurface, a snowmobile mounting member connected to said ski body, and at least one elongated blade member attached to said ski body and arranged about said ski body undersurface, said blade member defining a leading end portion and a trailing end portion, said snowmobile mounting member being attached to said steering link such that said push axis substantially registers with said leading end portion of said blade member when said snowmobile glides on the gliding surface;
    said ski body comprising a longitudinal runner extending on its said undersurface, said blade member carried by and extending longitudinally along said runner; said snowmobile ski comprising a wear bar affixed to said ski body undersurface and arranged substantially about said runner, said wear bar comprising said blade member; said wear bar further comprising: a curved, plate-like smoothing member located forwardly of said blade member for flattening irregularities in the gliding surface, and a trailing rod located rearwards of said smoothing member, said trailing rod carrying said blade member;
    and further including a couple of tabs extending longitudinally on each side of a front end portion of said trailing rod, and affixed thereto, said tabs merging with said smoothing member.

2. The snowmobile according to claim 1, wherein said steering link is an elongated kingpin defining a longitudinal axis, and wherein said push axis coincides with said longitudinal axis of said kingpin, and wherein said mounting member is pivotally connected to said steering link.

3. The snowmobile according to claim 1, wherein said runner defines a groove therealong, said wear bar trailing portion registering below said runner groove.

4. The snowmobile according to claim 1, wherein said trailing rod is cross-sectionally polygonal.

5. The snowmobile according to claim 4, wherein said trailing rod is cross-sectionally quadrangular.

6. The snowmobile according to claim 1, wherein upon said snowmobile resting on the gliding surface, said push axis forms an angle of between 30 to 45° with said elongated blade member.

* * * * *